(12) United States Patent
Bunce et al.

(10) Patent No.: US 7,758,928 B2
(45) Date of Patent: Jul. 20, 2010

(54) FUNCTIONALISATION OF PARTICLES

(75) Inventors: Timothy Rex Bunce, Vale of Glamorgan (GB); Bhukandas Parbhoo, Sully (GB); Pierre Chevalier, Brussels (BE)

(73) Assignee: Dow Corning Corporation, Midland, MI (US)

( * ) Notice: Subject to any disclaimer, the term of this patent is extended or adjusted under 35 U.S.C. 154(b) by 760 days.

(21) Appl. No.: 10/575,919

(22) PCT Filed: Oct. 8, 2004

(86) PCT No.: PCT/EP2004/011611

§ 371 (c)(1),
(2), (4) Date: Apr. 20, 2007

(87) PCT Pub. No.: WO2005/039753

PCT Pub. Date: May 6, 2005

(65) Prior Publication Data

US 2008/0056928 A1    Mar. 6, 2008

(30) Foreign Application Priority Data

Oct. 15, 2003 (GB) ................................. 0324147.8
Feb. 12, 2004 (GB) ................................. 0403131.6

(51) Int. Cl.
*B05D 3/14* (2006.01)
(52) U.S. Cl. ...................... 427/562; 427/213; 427/459; 427/460; 427/488; 427/576; 427/578; 427/45.1; 427/242; 427/446; 118/50.1; 423/345
(58) Field of Classification Search ................. 427/213, 427/45.1, 242; 423/345
See application file for complete search history.

(56) References Cited

U.S. PATENT DOCUMENTS 4,859,493 A * 8/1989 Lemelson .................... 427/562

(Continued)

FOREIGN PATENT DOCUMENTS

EP          0655516          5/1995

(Continued)

OTHER PUBLICATIONS

English language abstract for EP0655516 extracted from espacenet.com database Apr. 9, 2007.

(Continued)

*Primary Examiner*—Michael Barr
*Assistant Examiner*—Andrew Bowman
(74) *Attorney, Agent, or Firm*—Howard & Howard Attorneys PLLC

(57) ABSTRACT

This invention relates to a method of functionalizing a powdered substrate. The method comprises the following steps, which method comprises passing a gas into a means for forming excited and/or unstable gas species, typically an atmospheric pressure plasma or the like and treating the gas such that, upon leaving said means, the gas comprises excited and/or unstable gas species which are substantially free of electric charge. The gas comprising the excited and/or unstable gas species which are substantially free of electric charge is then used to treat a powdered substrate and a functionalizing precursor in a downstream region external to the means for forming excited and/or unstable gas, wherein neither the powdered substrate nor the functionalizing precursor have been subjected to steps (i) and (ii) and wherein said functionalizing precursor is introduced simultaneously with or subsequent to introduction of the powdered substrate. Preferably the method takes place in a fluidized bed.

19 Claims, 2 Drawing Sheets

U.S. PATENT DOCUMENTS

Figure 1:
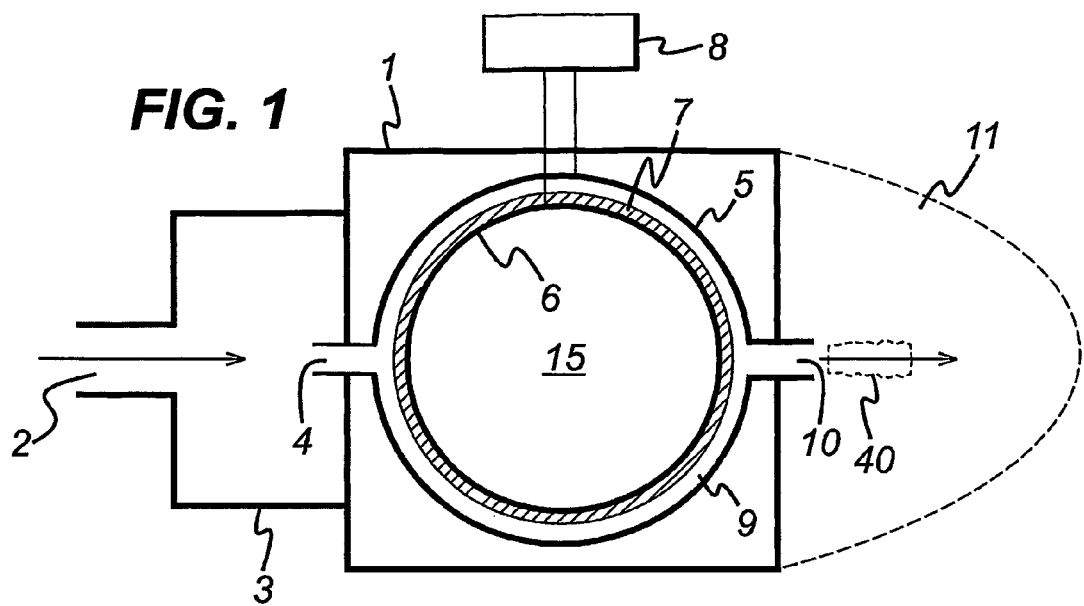

| | | | |
|---|---|---|---|
| 5,234,723 A | | 8/1993 | Babacz |
| 5,620,743 A | * | 4/1997 | Harth et al. ................. 427/213 |
| 5,807,615 A | | 9/1998 | Sindzingre et al. |
| 5,941,448 A | | 8/1999 | Sindzingre et al. |
| 6,241,858 B1 | | 6/2001 | Phillips et al. |
| 6,252,015 B1 | | 6/2001 | Vincenzi et al. |
| 6,428,861 B2 | | 8/2002 | France et al. |
| 6,569,397 B1 | * | 5/2003 | Yadav et al. ................. 423/345 |

FOREIGN PATENT DOCUMENTS

| | | |
|---|---|---|
| JP | 6000365 | 1/1994 |
| JP | 6228739 | 8/1994 |
| WO | WO97/29156 | 8/1997 |
| WO | WO02/28548 | 4/2002 |
| WO | WO03/085693 | 10/2003 |
| WO | WO03/086029 | 10/2003 |

OTHER PUBLICATIONS

English language abstract for JP6000365 extracted from espacenet.com database Apr. 9, 2007.

English language abstract for JP6228739 extracted from espacenet.com database Apr. 9, 2007.

Tatsuya Mori et al., Development of Silica Coating Methods for Powdered Pigments With Atmospheric Pressure Glow Plasma, Thin Solid Films 316 (1998), pp. 89-92.

Shuhei Ogawa et al., Zirconia Coating on Amorphous Magnetic Powder by Atmospheric Pressure Glow Plasma, Thin Solid Films 386 (2001), pp. 231-216.

A. Quede et al., Thermal Stability and Flammability Studies of Coated Polymer Powders Using A Plasma Fluidized Bed Process, Journal Of Materials Science 37 (2002), pp. 1395-1399.

J.B. Leroy et al, Treatment of a Polyethylene Powder Using a Remote Nitrogen Plasma Reactor Coupled With a Fluidized Bed: Influence on Wettability and Flowability, Plasmas and Polymers, vol. 8, No. 1, Mar. 2003, pp. 13-29.

* cited by examiner

FUNCTIONALISATION OF PARTICLES

RELATED APPLICATIONS

This application claims priority to and all the advantages of International Application No. PCT/EP2004/011611, filed on Oct. 8, 2004, which claims priority to Great Britain Patent Applications Nos. GB 0324147.8, filed on Oct. 15, 2003 and GB 0403131.6, filed on Feb. 12, 2004.

The present application describes a process for the surface activation and/or surface functionalisation of particles using excited and/or unstable gas processes that can be scaled-up for industrial production.

The need to compatibilise, or disperse inorganic and organic particles into product compositions is a major concern in many industries. This may be, for example, due to major difficulties in achieving acceptable particle dispersion, a factor which is often determined, at least partially, by the size of the particles and their surface chemistry. The surface chemistry of most solids, liquids or gel-like particles is determined by the manufacturing processes concerned. Furthermore, often after preparation particles can be stored for a long time before use and during this period there is a tendency for agglomeration to occur which can result in a change to their overall surface properties.

Even when a dispersion step is successfully completed the particles may need appropriate chemical functionalities to interact or bind to a matrix such as a polymeric, polymerisable and/or cross-linkable material. The need to specifically functionalise a solid substrate with an organic group bearing a chemical functionality compounds the problems regarding dispersability and is a widespread problem for many industrial processes leading to the need for complicated processes merely to render particles suitable for dispersion or the like. Problems are particularly seen, for example, in the case of active biomolecules (eg enzymes) where it is important to attach the biomolecules to a substrate without impairing the biological activity.

Another problem is a need for the passivation of inorganic powdered pigments. Passivation may for example be required in order to avoid skin irritation and other such problems in medical and toiletry type products. A further example for the need of passivation is in the recycling industry for rubbers and plastics, for example, the use of recycled rubbers and plastics in the automotive sector to achieve mechanical performances matching those of new polymer based products for minimal cost. Examples may include the recycling of natural rubber and synthetic styrene-butadiene rubbers (SBR) from tyres, and the recycling of ethylene propylene diene methylene (EPDM) and/or polypropylene from various parts in cars. It is noteworthy that the recycling industry also targets other plastic materials such as polypropylene (PP), polyethylene (PE), polyethylene terephthalate (PET), and the like.

Various groups in the world have looked at ways of recycling tyre rubber. Current recycling approaches for tyre rubber generally involve the incorporation of rubber particles (commonly referred to as "rubber crumb") into a polymer matrix to form composites. Usually, the mechanical properties of such composites are not high performance because of the low surface energy or low chemical reactivity of the organic surface.

Plasma, which is sometimes referred to as the fourth state of matter, is an at least partially ionised gaseous medium, made of excited, unstable and ionised atoms and molecules which emit visible and UV radiation. When matter is continually supplied with energy, its temperature increases and it typically transforms from a solid to a liquid and, then, to a gaseous state. Continuing to supply energy causes the matter to undergo a yet further change of state in which neutral atoms or molecules of the gas are broken up by energetic collisions to produce negatively charged electrons and positive or negatively charged ions. Other species generated in a plasma include high energy non-charged particles such as gas molecules in excited states, metastable compounds, molecular fragments and or radicals. The plasma is electrically neutral and therefore contains positive ions, negative ions and electrons in amounts such that the algebraic sum of their charges is zero. A plasma phase is obtained in the laboratory by subjecting a pure gas or a gaseous mixture to external excitation, which is most generally electrical.

The term "plasma" covers a huge range of systems whose density and temperature vary by many orders of magnitude. Some plasmas are very hot and all their microscopic species (ions, electrons, etc.) are in approximate thermal equilibrium, the energy input into the system being widely distributed through atomic/molecular level collisions; examples include flame based plasmas. Other plasmas, however, particularly those at low pressure (eg 100 Pa) where collisions are relatively infrequent, have their constituent species at widely different temperatures and are called "non-thermal equilibrium" plasmas.

In non-thermal equilibrium plasmas, free electrons are very hot with temperatures of many thousands of Kelvin (K) whilst neutral and ionic species remain cool. Because the free electrons have almost negligible mass, the total system heat content is low and the plasma operates close to room temperature thus allowing the processing of temperature sensitive materials, such as plastics or polymers, without imposing a damaging thermal burden. The hot electrons create, through high energy collisions, a rich source of radicals and excited and/or unstable species with a high chemical potential energy capable of profound chemical and physical reactivity. It is this combination of low temperature operation plus high reactivity which makes non-thermal equilibrium plasma technologically important and a very powerful tool for manufacturing and material processing as it is capable of achieving processes which, if achievable at all without plasma, would require very high temperatures or noxious and aggressive chemicals.

Because of their potential in industrial applications atmospheric pressure plasma (APP) systems are of particular interest to industry. APP includes atmospheric pressure non-thermal equilibrium plasma which is typically generated between two parallel electrodes that vary in size and configuration but which need to be within several mm distance from each other. Depending on the electrical circuitry and on system configurations, atmospheric pressure glow discharge (APGD) and/or dielectric barrier discharge (DBD) plasmas are generally produced. Advantageously, when compared to many plasma-based systems currently available, APP operates at about atmospheric pressure and at low temperatures (<200° C. and preferably <100° C.). However, limitations exist with respect to system geometry, because the plasma is produced in a plasma region between parallel electrodes with very small gaps between electrodes. It is ideally suited to treat flat, thin and flexible substrates like plastic films, textile webs, etc.

In the case of the preparation of powders using APGD type processes, one problem regarding the geometry of the system is that during the generation of powders, other species such as particles, by-products, reactants, and/or treated particles, may deposit on the electrodes, thereby negatively affecting the electrical and chemical properties of the plasma and potentially the duration of usefulness of the electrodes. Furthermore, the use and/or preparation of electrically conducting particles using APGD is difficult as such particles would interact with the electrical field and create filaments or local discharges and potentially adhere to electrode surfaces.

Recently, new plasma systems have been developed which produce plasmas using gases passing between adjacent and/or coaxial electrodes at high flow rates. These gases pass through the plasma region defined by the shape of the electrodes and exit the system in the form of excited and/or unstable gas mixtures at around atmospheric pressure. These gas mixtures are characterized by being substantially free of electrical charged species, which may be utilized in downstream applications remote from the plasma region, ie the gap between the adjacent electrodes in which plasma is generated. This "atmospheric pressure post plasma discharge" (APPPD) has some of the physical characteristics of low pressure glow discharge and APGD including, for example, glow, presence of active light emitting species and chemical reactivity. However, some clear and unique differences exist including the facts that APPPD has higher thermal energy, absence of boundary walls eg no electrodes, substantial absence of electrically charged species, large choice of gases and mixture of gases, large flow rate. of gases.

U.S. Pat. No. 5,807,615 describes a "post discharge" atmospheric pressure plasma system for depositing eg silicon oxide films on metal substrates wherein a "primary" gas is excited by being passed through a plasma and is then mixed with a precursor gas downstream of the plasma. The precursor gas was a silicon containing compound which has not been plasma treated. The precursor gas was excited by interaction with the primary gas resulting in the formation of a film on a substrate surface. The post discharge nature of this system resulted in the substantial absence of any electrically charged species other than in the plasma region between the electrodes.

The treatment of powdered substrates using atmospheric pressure plasma has been previously described. In JP 06-000365 there is provided an apparatus for continuously plasma treating a powdered substrate by coaxially pivoting a metallic inner and outer cylinders at least one side of the outer cylinder being coated with a dielectric to form a fixed gap between the cylinders, inclining the cylinders and passing a voltage across the electrodes to effect an atmospheric pressure plasma treatment of a powdered substrate. In JP 06-228739 there is provided a means for surface treating a powdered substrate by atmospheric-pressure glow discharge by gas floating the powdered substrate with a rare gas or mixture of a rare gas and a gaseous reactant. The treatment occurs in a substantially cylindrical vertical positioned reaction vessel at the bottom of which gas is introduced to float the powdered substrate and the exit is out of the top of the vessel carried by the gas having been first subjected to and atmospheric-pressure glow discharge at a pressure higher than atmospheric pressure. In U.S. Pat. No. 5,399,832 there is provided a method for treating and/or coating an organic or inorganic powdered substrate using an organic monomer with atmospheric pressure glow discharge.

In WO 97/29156 there is provided a method of treating de-agglomerated particles with plasma activated gas to modify the surface of the particles and species. EP 0655516 describes the coating/surface treatment of solid particles using a plasma fluidised bed in which a plasma is generated outside the fluidised bed using a gaseous coating material and a carrier gas which excited mixture is subsequently introduced into the fluidised bed for coating particles. Leroy et al, have described a process involving the treatment of a polyethylene powder using a remote nitrogen plasma reactor coupled with a fluidised bed in Plasmas and Polymers 8(1) 2003 p 13-29. Mori et al describe the development of silica coating methods for powdered pigments with atmospheric pressure glow plasma in Thin Solid films 316(1,2) 1998 p 89-92 and Ogawa et al. describe the preparation of zirconia coatings on amorphous magnetic powder by atmospheric pressure glow plasma in Thin Solid Films 386(2) 2001 p 213-216. U.S. Pat. No. 6,428,861 describes a system for treating particulate matter in a continuous or semi-continuous mode at sub-atmospheric pressure. Quede et al., (J. Materials Sci., 37, 2002 p 1395-9) have described a cold remote nitrogen plasma system used to treat polyamide-6 and polyamide-6 clay nanocomposite powders and subsequently coating them with plasma polymerised 1,2,3,3-tetramethyldisiloxane. The reactor was used to deposit the coating on the polymer powders in a fluidised bed reactor. U.S. Pat. No. 6,241,858 describes a vacuum plasma process for coating a thin film onto powdered substrates. U.S. Pat. No. 5,234,723 describes a continuous reduced pressure plasma based method for treating particles with gaseous plasma activated species in order to functionalise, coat or graft the plasma activated species on to the particles.

All of the aforementioned prior art generally relates to the activation of the powdered substrate or applications of coatings using gas phase precursors and typically the results suggest low deposition rates and require high residence times to obtain a sufficiently coated surface.

WO 02/28548 describes a process for enabling the introduction of a solid or liquid precursor into an atmospheric pressure plasma discharge and/or an ionised gas stream resulting therefrom in order to form a coating on a substrate. The substrate may be a powder. WO 03/086030, which was published after the priority date of the present invention describes a method of forming a coating on a powdered substrate within the plasma generated between the electrodes using a process adapted from WO 02/28548.

In accordance with a first embodiment of the present invention there is provided a method of functionalising a powdered substrate, which method comprises the following steps:

i) passing a gas into a means for forming excited and/or unstable gas species;

ii) treating said gas such that upon leaving said means the gas comprises excited and/or unstable gas species which are substantially free of electric charge; at a temperature below 500° C.

iii) treating the powdered substrate with said excited and/or unstable gas species and a functionalising precursor in a downstream region external to the means for forming excited and/or unstable gas, wherein neither the powdered substrate nor the functionalising precursor have been subjected to steps (i) and (ii) and wherein said functionalising precursor is introduced simultaneously with or subsequent to introduction of the powdered substrate;

iv) collecting resulting functionalised substrate.

For the purposes of this application a powder is a solid material in the form of nanoparticles, nanotubes, particles, particulates, pellets, platelets, needles/tubes, flakes, dust, granulates and any aggregates of the aforementioned forms. It is to be understood that the term "electrically charged species" as used herein is intended to mean ions and electrons. Functionalisation in accordance with the present invention is to be understood to mean grafting a functional group or compound bearing functional groups onto and/or into a substrate. Functionalisation may also include coating or encapsulation of the substrate by grafting or covalent bonding with a compound bearing functional groups.

The means for forming excited and/or unstable gas species at a temperature of between 10° C. and 500° C. is adapted to excite a gas or gases passing there through, which gas or gases upon leaving said means comprises excited and/or unstable gas species which are substantially free of electrical charges. Such excitation is preferably obtained by electrical discharge between pairs of electrodes, for example, of the non-thermal equilibrium plasma type, such as glow discharge and/or dielectric barrier discharge. Other methods capable of exciting a gas mixture such as corona discharge, light radiation assisted processes eg laser, and any other high energetic methods may be used and therefore are to be interpreted as falling within the scope of this invention. Preferably the excited gas mixture is generated in a non-thermal equilibrium plasma and/or dielectric barrier discharge and/or corona discharge under approximately atmospheric pressure conditions (eg from about $0.1 \times 10^5$ Pa to about $3 \times 10^5$ Pa but preferably at a pressure of between from about $0.5 \times 10^5$ Pa to about $1.5 \times 10^5$ Pa). Most preferably the means for forming excited and/or unstable gas species is a non-thermal equilibrium plasma system adapted to provide a post plasma discharge region of excited and/or unstable species downstream from and preferably external to the means for forming excited and/or unstable gas species. Henceforth this region will be referred to as "the downstream region". The downstream region is generally substantially free of charged particles. The operating temperature of the means for forming excited and/or unstable gas species is between 10 and 500° C., preferably between 10 and 400° C. More preferably the operating temperatures of such apparatus is from about room temperature (ie about 20° C.) to about 200° C. but most preferably, the method of the present invention will operate at temperatures between room temperature (20° C.) and 160° C. Preferably, gas to be excited by the plasma has a high flow rate of greater than 50 liters/min, preferably in the range of from 50 liters/min to 500 liters/min, more preferably from about 75 liters/min to 300 liters/min through the means for forming excited and/or unstable gas species.

The means for forming excited and/or unstable gas species at a temperature of between 10° C. and 500° C. may comprise any equipment suitable for use in producing a downstream region. An atmospheric pressure non-equilibrium plasma system, particularly an atmospheric pressure glow discharge having a sufficiently high gas flow rate for the production of a downstream region is preferred. Many atmospheric pressure based plasma systems such as glow discharge based systems typically have low gas flow rate systems in which the plasma is generated between adjacent electrodes and do not provide a downstream region of the type required in accordance with the present invention and as such are unsuitable for the preparation of particles in accordance with the present invention. A sufficiently high gas flow rate for the production of a downstream region is preferred might, for example be greater than 50 liters a minute, but is determined based on the geometry of the apparatus being used The means for forming excited and/or unstable gas species may alternatively be a dielectric barrier discharge and/or corona discharge system having a sufficiently high gas flow rate in order to provide a suitable downstream region, which is preferably substantially free of charged species, for treating the functionalising precursors in accordance with the method of the present invention. Particularly preferred means for forming excited and/or unstable gas species include the so-called plasma jet and plasma knife type systems.

Particularly preferred systems for the present invention are the means for forming excited and/or unstable gas species as described in U.S. Pat. No. 5,941,448 and/or in the applicant's co-pending application WO 03/085693, when used with a dynamic gas flow. WO 03/085693 was published after the earliest priority date of the present invention.

A typical means for forming excited and/or unstable gas species for use in the method of the present invention is an atmospheric pressure non-equilibrium plasma system which may incorporate an electrode configuration comprising one or more pairs of concentric electrodes between which a plasma is generated and/or dielectric barrier discharge and/or corona discharge occurs. The distance between the electrodes in which the plasma is generated is preferably a substantially constant gap of from 1 to 100 mm, preferably from 2 to 10 mm between the electrodes. The electrodes being radio frequency (RF) energised with a root mean square (rms) potential of from 1 to 100 kV, preferably between 1 and 30 kV and most preferably between 2.5 and 10 kV, however the actual value will depend on the chemistry/gas choice and plasma region size between the electrodes. The frequency is generally between from 1 to 500 kHz, preferably at 10 to 300 kHz. The power used in the apparatus is preferably greater than or equal to 1 W/cm$^2$, more preferably greater than or equal to 10 W/cm$^2$ and most preferably will be between from about 10 to about 100 W/cm$^2$ (normalised per unit surface area of dielectric).

The preferred electrode system comprises a concentric cylindrical electrode configuration having an inlet for the introduction of the gas to be excited and an outlet, in the form of a slit, through which excited and/or unstable gas is able to leave the excitation region, ie the plasma region in which a plasma is generated. The excitation region is substantially the gap between adjacent pairs of concentric electrodes where a plasma is formed and/or dielectric barrier discharge and/or corona discharge occurs. The electrode configuration typically comprises an inner cylindrical electrode and an outer concentric tubular electrode. At least one of the electrodes has a layer of a dielectric material between it and the other electrode. Preferably, at least the inner face of the outer electrode or the outer face of the inner electrode is covered with a dielectric material. A slit is provided along most of the axial length of the outer electrode configuration in order to provide an elongate source of excited and/or unstable gas in the downstream region into which functionalising precursor is introduced. In such a configuration a plume is visible substantially immediately external to the slit in the outer electrode. The visible plume is generally considered to be caused by excited and/or unstable species (atoms and molecules) eg metastables, giving off energy when returning to their ground state after having been in the downstream region.

Metal electrodes may be used and may be, for example, in the form of metallic cylinders, tubes, pins, plates or mesh. The metal electrodes may be bonded to dielectric material either by adhesive or by some application of heat and fusion of the metal of the electrode to the dielectric material. Alternatively, one or more of the electrodes may be encapsulated within a dielectric material, or may be in the form of a dielectric material with a metallic coating such as, for example, a dielectric, preferably a glass dielectric with a sputtered metallic coating. Alternatively, and where suitable, the electrodes used in the present invention may be of the substantially non-metallic type described in the applicants co-pending application WO 2004/068916 which was published after the priority date of the present application.

The dielectric materials may be made from any suitable dielectric, examples include but are not restricted to polycarbonate, polyethylene, glass, glass laminates, epoxy filled glass laminates, ceramics and the like.

The introduction of the excited and/or unstable gas species into the downstream region is preferably achieved by passing a gas, at a high flow rate (eg greater than 50 liters/min), through the electrode configuration of the atmospheric pressure non-equilibrium plasma system described above, which when a potential difference is applied between the electrodes generates a plasma or dielectric barrier discharge and/or corona discharge between adjacent pairs of electrodes. When a plasma is generated between the electrodes, the gap between the electrodes will contain an ionised gaseous medium, comprising excited and ionised atoms and molecules and will emit visible and UV radiation. Gas having passed between the electrodes and out through the slit comprise an excited and/or unstable gas mixture, which is substantially free of electrically charged species as substantially all the charged species will remain in the gap between the electrodes. The visible plume which is observed at the slit is the effect of the high energy non-charged excited and unstable atoms and molecules such as metastable atoms and/or molecules, gas molecules in excited states, molecular fragments and/or radicals giving off energy when returning to their ground state.

The geometry of the above electrode configuration means that a system of this type offers unique advantages that allow practical, economic, and large-scale production.

Preferably the means for forming excited and/or unstable gas species is adapted to introduce excited and/or unstable gas species into a downstream region which is retained in a suitable reactor. Any suitable reactor may be utilised, but preferably the reactor is a fluidised or circulating bed reactor. A fluidised or circulating bed in the context of the present invention means a process based on fluidised beds of solid particles, in which the solids, by suspension or agitation, exist in an expanded state with zero angle of repose and assume the shape of the containing vessel. Such fluidised beds may also be known as moving bed, aerated beds, self supporting or boiling beds, bubbling beds and turbulent beds, and when the gas superficial velocities are high enough can also become relatively dilute circulating and transport systems. Fluidisation is generally achieved by pneumatic gas velocity means but can also be assisted by mechanical and sonic means known to those skilled in the art. Transport systems suitable for the present invention include the fluidised bed systems described in Perry's Chemical Engineer's handbook 6th Ed, 1984 pages 20-59 to 20-77, with particular reference to FIGS. 20-75. Alternative reactors which may be utilised for the method in accordance with the present invention include, for example rotating drums, rotary kilns, jet mixers, flat bed reactors (FBR) with recycle/ageing loops, static mixing reactors, sonic mixing reactors, vibrating beds, conveyor belts, tumblers alone or in any suitable combination.

When the reactor used for the present invention is in the form of a fluidised or circulating bed, the means for forming excited and/or unstable gas species is positioned such that the gas which is used as the source of excited and/or unstable gas species in the downstream region at the base of the fluidised or circulating bed reactor is also utilised as the gas supporting the fluidised or circulating bed. The use of a fluidised or circulating bed type of system results in excellent mixing and thereby, a generally consistent product particle size, which may be substantially predetermined by pre-setting the exposure time of the functionalising precursors in the downstream region of the fluidised or circulating bed. The functionalised and non-functionalised powder circulating in the fluidised or circulating bed will be transportable through both the downstream region and where appropriate through the external plume.

Additional gas inlets or exits from external gas sources and/or additional means for forming excited and/or unstable gas species may be positioned anywhere in the fluidised or circulating bed eg at the bottom, side or top of the reactor, to assist in suspending particles and/or droplets or the like against gravity. Each of said additional means would utilize the same source of gas as the gas for the fluidised or circulating bed. A single acoustic self-oscillating jet plasma head may be utilised to offer dynamic mixing/fluidisation in the fluidised or circulating bed as well as forming a plasma between electrodes.

The powdered substrate may, be introduced into the downstream region by any suitable means, for example, powdered substrate may be introduced by merely being dropped under gravity into or through the downstream region or may be transported there through on a support or the like such as on a reel to reel support, conveyor belt or vibrating conveyor. In one preferred embodiment the powder enters the downstream region in a fluidised or circulating bed of the type as described above. Alternatively, the powdered substrate may be entrained on a carrier gas or transported in a vortex or dual cyclone type apparatus. Preferably, the powdered substrate is always introduced into the downstream region whilst the plasma is being generated and as such the powdered substrate is always treated with excited and/or unstable gas species in the down stream region.

Furthermore, the powdered substrate and/or functionalising precursor may be maintained stationary in a suitable container which may be fixed in the downstream region, in which case, if required, the means for forming excited and/or unstable gas species may be moved relative to the container and the functionalising precursor may be adapted to be introduced directly into the container. Whichever means of transporting and/or retaining the powdered substrate is utilised, it is preferred that the exposure time in which powdered substrate remains within the downstream region is constant in order to ensure an even treatment throughout the duration of the method in accordance with the present invention.

By adding functionalising precursors in the downstream region, which is substantially free of charged species, powdered compounds mixed with functionalising precursor in accordance with the method of present invention may be functionalised.

The functionalising precursor is preferably in the form of a liquid and/or gas precursor but may be introduced in the form of a solid or a liquid/solid slurry. For the sake of this invention, a liquid shall be understood to mean liquid compound, a solution of a high viscosity liquid or solid compound in a liquid carrier or a liquid co-reactive and/or a molten solid. When using a liquid functionalising precursor, the liquid functionalising precursor may be entrained on a carrier gas or transported in a vortex or dual cyclone type apparatus, in which case the liquid to be treated may be fed in through one or more inlets within eg a fluidised bed.

When using a functionalising precursor in liquid form and where used solid or liquid/solid slurry, the liquid may be introduced into the reactor and/or brought into contact with the powdered substrate and where appropriate the excited and/or unstable gas using any suitable means. In a preferred embodiment, the liquid precursor is preferably introduced into the reactor (typically a fluidised bed) by way of a liquid spray through an atomiser or nebuliser (hereinafter referred to as an atomiser) as described in the applicants co-pending application WO 02/28548. This provides the invention with a major advantage over the prior art in that the liquid precursor may be introduced into the reactor and mixed with the powdered substrate and, where appropriate, the excited and/or unstable gas in the downstream region in the absence of a carrier gas, ie a liquid precursor can be introduced directly into the reactor by, for example, direct injection.

Any suitable atomiser maybe utilised for the atomisation and introduction of said liquid precursor, examples include the use of an ultrasonic nozzle or pneumatic nebulisers and nozzles. The atomiser preferably produces a liquid precursor drop size of from 10 nm to 100 μm, more preferably from 1 μm to 50 μm. Suitable atomisers for use in the method in accordance with the present invention are ultrasonic nozzles from Sono-Tek Corporation, Milton, N.Y., USA or Lechler GmbH of Metzingen Germany and Pneumatic nozzles or intersurgical chambers from Clement Clarke International.

The apparatus which may be utilised in the method in accordance with the present invention may include a plurality of atomisers.

In one preferred embodiment of the present invention there is provided a single unit comprising the means for forming excited and/or unstable gas species, a powder introduction means for introducing powders to be treated into the excited and/or unstable gas, a functionalising precursor introduction means for introducing functionalising precursors into the downstream region (ie in cases where a plasma is being generated into the excited and/or unstable gas) and a suitable means of collecting the end product eg by way of an electrostatic precipitator, a cyclone, a scrubber, a filter system or the like. Preferably the means for collecting the end product may be positioned downstream of the excited and/or unstable gas regions, particularly in cases where the resulting product particles are very fine eg nanoparticulate sized particles where the particles float in eg a fluidised or circulating bed.

The functionalising precursor may come into contact with the powdered substrate either in the presence or not of the excited and/or unstable gas species. Where required the functionalising precursor is introduced whilst the excited and/or unstable gas species generating means, typically an atmospheric non-equilibrium plasma system, is operational. However, in the case where only the powdered substrate needs to be activated by excited and/or unstable gas species, the plasma may be stopped resulting in the substantial absence of excited and/or unstable gas species during the period of interaction between the previously activated powdered substrate, (activated by interactions in the downstream region with the excited and/or unstable gas species), and the functionalising precursor. It will be appreciated that whilst the plasma generator is switched off, unexcited gas or gases may continue to pass through the means for generating excited and/or unstable gas species, in order to maintain the functioning of the fluidised bed during the interaction between the activated powdered substrate and the functionalising precursor. Whilst it is perfectly feasible for the powdered substrate and functionalising precursor to be mixed in the fluidised bed prior to the formation of a plasma, ie the application of a "wet" coating onto the substrate prior to plasma treatment, this is not generally preferred as it is more likely to lead to physisorption rather than chemisorption. However in the case of a multiple application process one stage could involve a substrate wetting step prior to plasma formation should the need arise.

Preferably, both particles of functionalised and non-functionalised powders which are present in the downstream region in accordance with the present invention (preferably in a fluidised or circulating bed), are prevented from passing into the electrode configuration through the exit slit and depositing on one or more of the electrodes, by the flow rate of the gas or excited and/or unstable gas entering the fluidised or circulating bed through the slit, dependent on whether or not a plasma is being generated between the electrodes. However, where appropriate, an electrically conducting mesh may be placed in the fluidised or circulating bed external to the outer electrode, preferably between the external plume and the downstream region. The inclusion of the mesh may serve several purposes. Firstly, it significantly reduces the opportunity for, and preferably prevents, particles of functionalised and non-functionalised powders, obtained in accordance with the method of the present invention, entering the slit and depositing on an electrode surface. Secondly, it also substantially prevents any residual charged species from entering the downstream region. Thirdly, it acts as a means of distribution for the gas being introduced into the fluidised or circulating bed, ie it will spread the entry of gas into the fluidised or circulating bed. The electrically conducting mesh may be made from any suitable material but is preferably made from stainless steel, copper or the like. Preferably the electrically conducting mesh has a voltage applied to it such that it will attract or repel all positively or negatively charged molecules present in the plume and thereby prevent said charged molecules from entering the downstream region in the fluidised or circulating bed.

Preferably ageing and/or recycling loops may be provided such that activated/non-activated powdered substrates and functionalising precursors etc. may be removed from and re-introduced into the reactor until the required functionalised product has been prepared. These may be particularly useful when a predetermined particle size is required with respect to the functionalised powdered product.

Functionalised particles resulting from the method in accordance with the present invention may be collected by any suitable means for example they may be collected by electrostatic precipitators, filters, cyclones, scrubbers and/or electrophoresis and the like. Other options for collecting the resulting product include a statically electric charged porous plate or a vibrating sieve placed in line with the exit of the powdered particles from the plasma region to collect the resulting powdered particles.

In one embodiment of the present invention a multiple series of treatments of the substrate may occur. For example an untreated substrate may be introduced into the reactor, typically a fluidised bed, and may initially be activated or the like by interaction with excited gaseous species. The gaseous species could be an oxidising gas or reducing gas. After a period of activation, the plasma may be stopped whilst maintaining the flow of gas to fluidise the contents of the fluidised bed and then a suitable first functionalising precursor may be introduced to interact with activated substrate. The substrate treated with the first functionalising precursor may then be reactivated by regenerating the plasma and therefore the downstream region. Typically, however any such second or greater plasma activation step should be shorter in duration than the initial activation step to ensure that previous results of functionalisation processes are not substantially removed by the plasma during reactivation. For example, if the first functionalising precursor is a compound containing Si—H bonds, subsequent to functionalisation such bonds might be oxidised in an oxidising excited gas such as air, resulting in the provision of the more reactive Si—OH. A further functionalising precursor may then be added and the process continued until a sufficient loading of functionalising groups required has been achieved for the purpose required. The man skilled in the art will appreciate that an enormous range of alternative processes may be entertained using this route to gradually build up functionalised coatings on the substrates by the method in accordance with the present invention.

The inventors have also found that the introduction of mild basic organic or inorganic catalysts for example amines, pyridine, ammonium hydroxide or dimethylaminopropanol catalyse condensation type reactions involved in the multiple coating processes. The amines may for example, comprise tertiary amines, such as trialkyl amines eg triethylamine or tripropylamine, secondary amines such as dipropylamine. A chosen catalyst may be advantageously added where the multi-step process of the type disclosed above involves condensation reactions. The addition of such compounds is seen to both promote condensation and reduce significantly the leaching on non-bonded chemicals.

Such multi-step processes may lead to substrates with significantly higher loadings of functionalised coatings than are typically obtained with respect to traditional powder coating processes. For example, after an initial functionalising precursor has been applied onto the powdered substrate the functionalised substrate may be retreated; ie the functionalised substrate may be subjected to a plasma, for example an oxidative plasma, and a further application of the, or another, functionalising precursor may be applied. Any appropriate number of application steps may be utilised as required in order to obtain the wanted level of functionalisation in accordance with the process of the present invention The gas used to form the excited and/or unstable gas species which are provided to the downstream region need not comprise noble gases such as helium and/or argon and therefore, may be solely air, nitrogen, oxygen, hydrogen, or the like, and any suitable mixture thereof. Where an oxidising or reducing gas is required to be included in the gas used to form the excited and/or unstable gas species, the gas used may comprise a mixture of, for example, nitrogen with an appropriate oxidising gas such as $O_2$, $H_2O$, $CO_2$, $CO$, nitrogen oxides (such as $NO_2$), or air and nitrogen with an appropriate reducing gas, such as $H_2$, $CH_4$ or $NH_3$ when a reducing plasma environment is required. However, the selection of gas depends upon the plasma processes to be undertaken. Oxidizing or reducing gases will be used alone or in mixtures, typically with nitrogen in any appropriate mixture such as for example in the case of an nitrogen and oxygen mixture, the mixture may comprise 90-99.995% nitrogen and 50 ppm to 10% oxidizing or reducing gas. The noble gases, Ar, He, Ne, Xe and Kr may be utilised alone or in combination with oxidising or reducing gases (Ar and/or He being the most preferred) but are expensive and as such are only used if needed. Mixtures of any of the above may also be used where deemed appropriate.

Under oxidising conditions, the present method may be used to form an oxygen containing coating on the powdered substrate. For example, silica-based coatings can be formed on the powdered substrate surface from atomised silicon-containing coating-forming materials. Under reducing conditions, the present method may be used to form oxygen free coatings, for example, silicon carbide based coatings may be formed from atomised silicon containing coating forming materials.

Whilst gases may be excited due to microwave excitation in the method of the present invention, this is not a preferred option.

The method in accordance with the present invention is particularly suited for functionalising powdered substrates which are sensitive to other functionalising type processes and are particularly useful for functionalising powdered substrates which are sensitive to, for example, heat/temperature and UV light.

The powdered substrates to be functionalised may comprise any suitable material, for example metals, metal oxides, silica and silicates, eg rice hull ash, carbon, organic powdered substrates, including polymeric, dyestuffs, fragrances, flavourings, pharmaceutical powdered substrates such as penicillins and antibiotics as well as biologically active compounds for example proteins, including enzymes and other protein based materials. The powdered substrate may also comprise biochemical compounds such as amino acids and/or their derivatives, grafted or covalently bonded biochemical compounds such as proteins, enzymes and DNA, silicone resins, mineral fillers such as for example carbon black, clays, $CaCO_3$, talc, silica, mica conductive fillers, $TiO_2$ nanoparticles, metal oxides such as $TiO2$, $ZrO_2$, $Fe_2O_3Al_2O_3SiO_2$, $B_2O_3$, $Li_2O$, $Na_2O$, $PbO$, $ZnO$, or, $CaO$, $Pb_3O_4$ and $CuO$ and mixed oxides, graphite, phosphorus particles, pigments and the like; metalloid oxides, mixed oxide, organometallic oxides, organometalloid oxides, organomixed oxide resins and/or an organic resin, sodium carbonate potassium nitrate, silicon metal particles, silicone rubber crumb, organic rubber crumb such as EPDM and Polypropylene. Rice hull ash is a biogenic amorphous silica, comprising 93 to 97% crystalline silica, which generally contains less than 5% by weight of amorphous carbon and less than 1% by weight of other various silicas.

It is to be understood that the functionalising precursor may be used to functionalise any appropriate powdered substrate and/or chemically modify an existing powdered substrate surface. The type of functionalisation formed on the powdered substrate surface is determined by the functionalising precursor and gas used to form excited and/or unstable species in accordance with the present invention.

Organometalloid liquid functionalising precursors may contain any suitable groups, in addition to the functional group of interest, which may react in the excited and/or unstable gas into which the precursor is introduced in accordance with the present invention to form the respective functionalised powdered substrate. In particular, in the case of silicon based functionalising precursors, for functionalising silicone resins, preferred groups present on the precursor include hydrogeno atoms, hydroxyl groups, epoxy groups, an acryloxy group, an alkylacryloxy group, alkoxy groups and chloro groups, or alkyl or aryl groups bearing one or more of the functionalities described above. Examples of suitable metalloid alkoxides include silicon tetramethoxide and germanium tetraisopropoxide. It is to be understood that the term organometalloid liquid, as used herein, includes polymers of organometalloid elements, and in particular in the case of silicon, preferably include liquid organosilanes such as, for example diphenylsilane and dialkylsilanes, eg diethylsilane and functionalised silanes containing one or more of the following: alkenyl, aryl, H, OH, amino groups, aldehyde groups alkyl halide groups, alkyne groups amido groups, carbamate groups, urethane groups, organic salts, carboxylic acid groups and their derivatives such as acid anhydride groups, organic groups containing boron atoms and phosphorus and sulphur containing groups such as mercapto and sulphido groups and grafted or covalently bonded biochemical groups such as amino acids and/or their derivatives, grafted or covalently bonded biochemical species such as proteins, enzymes and DNA.

Alternatively, the precursor for silicon based products may comprise linear, branched and/or cyclic organopolysiloxanes for the formation of silica and silicates (silicone resins). The linear or branched organopolysiloxanes suitable as liquid precursors for the method of the present invention include liquids of the general formula W-A-W, where A is a polydiorganosiloxane chain having siloxane units of the formula $R''_sSiO_{4-s/2}$ in which each $R''$ independently represents an alkyl group having from 1 to 10 carbon atoms, an alkenyl group such as vinyl, propenyl and/or hexenyl groups; hydrogen; an aryl group such as phenyl, a halide group, an alkoxy group, a silanol group, an epoxy group, an acryloxy group, an alkylacryloxy group or a fluorinated alkyl group. Generally, s has a value of 2, but may in some instances be 0 or 1. Preferred materials are linear materials ie s=2 for all units. Preferred materials have polydiorganosiloxane chains according to the general formula—(R"$_2$SiO)$_m$— in which each R" may be the same or different and is as hereinbefore described and m is a whole number and preferably has a value from 1 to about 4000 or greater. Suitable materials have viscosities of the order of about 0.65 mPa·s to about 1,000,000 mPa·s. When high viscosity materials are used, they may be diluted in suitable solvents to allow delivery of liquid precursor in the form of a finely dispersed atomised spray, or fine droplets, although as previously discussed, it is preferred to avoid the need for solvents if possible. Most preferably, the viscosity of the liquid precursor is in the range between about 0.65 mPa·s and 1000 mPa·s and may include mixtures of linear or branched organopolysiloxanes, as hereinbefore described, suitable as liquid precursors.

The groups W may be the same or different. The W groups may be selected, for example, from —Si(R")$_2$X, or

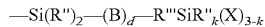
—Si(R")$_2$—(B)$_d$—R'"SiR"$_k$(X)$_{3-k}$ where B is —R'"—(Si(R")$_2$—O)$_r$—Si(R")$_2$— and R" is as aforesaid, R'" is a divalent hydrocarbon group, r is zero or a whole number between 1 and 6, and d is zero or a whole number, most preferably d is 0, 1 or 2, k is 0, 1, 2 or 3, X may be the same as R" or a hydrolysable group such as an alkoxy group containing alkyl groups having up to 6 carbon atoms, an epoxy group or a methacryloxy group or a halide.

Cyclic organopolysiloxanes having the general formula (R"$_2$SiO$_{2/2}$)$_n$, wherein R" is hereinbefore described, n is from 3 to 100 but is preferably from 3 to 22, most preferably n is from 3 to 6. Liquid precursors may comprise mixtures of cyclic organopolysiloxanes as hereinbefore defined.

The functionalising precursor may alternatively comprise suitable organic materials, including carboxylates, methacrylates, acrylates, styrenes, methacrylonitriles, alkenes and dienes, for example methyl methacrylate, ethyl methacrylate, propyl methacrylate, butyl methacrylate, and other alkyl methacrylates, and the corresponding acrylates, including organofunctional methacrylates and acrylates, including glycidyl methacrylate, trimethoxysilyl propyl methacrylate, allyl methacrylate, hydroxyethyl methacrylate, hydroxypropyl methacrylate, dialkylaminoalkyl methacrylates, and fluoroalkyl (meth)acrylates, methacrylic acid, acrylic acid, fumaric acid and esters, itaconic acid (and esters), maleic anhydride, styrene, α-methylstyrene, halogenated alkenes, for example, vinyl halides, such as vinyl chlorides and vinyl fluorides, and fluorinated alkenes, for example perfluoroalkenes, acrylonitrile, methacrylonitrile, ethylene, propylene, allyl amine, vinylidene halides, butadienes, acrylamide, such as N-isopropylacrylamide, methacrylamide, epoxy compounds, for example glycidoxypropyltrimethoxysilane, glycidol, styrene oxide, butadiene monoxide, ethyleneglycol diglycidylether, glycidyl methacrylate, bisphenol A diglycidylether (and its oligomers), vinylcyclohexene oxide, conducting polymers such as pyrrole and thiophene and their derivatives, and phosphorus-containing compounds, for example dimethylallylphosphonate. Organic functionalising precursors may also include an organic compound comprising any one of the following groups alkenyl, aryl, H, —OH, amino groups, aldehyde groups alkyl halide groups, alkyne groups amido groups, carbamate groups, urethane groups, organic salts, carboxylic acid groups and their derivatives such as acid anhydride groups, organic groups containing boron atoms, phosphorus and sulphur containing groups such as mercapto and sulphido groups and grafted or covalently bonded biochemical groups such as amino acids and/or their derivatives, grafted or covalently bonded biochemical species such as proteins, enzymes and DNA.

Suitable inorganic coating-forming materials include metals and metal oxides, including colloidal metals. Organometallic compounds may also be suitable coating-forming materials, including metal alkoxides such as titanates, tin alkoxides, zirconates and alkoxides of germanium and erbium and mixtures thereof to make ceramic coatings on the powdered materials.

The functionalised powdered substrate may be post treated with any appropriate treatment, for example it may undergo a plasma treatment. Post treatment is likely to involve the application of coatings or modification of the functionality. For example, a functionalised substrate may be post treated in a range of plasma conditions, ie to oxidise or reduce the initial functionalising group attached to the substrate. In one example the powdered substrate may be treated with silanes comprising silicon-hydrogen bonds (Si—H). The Si—H functionalised particles may then be subjected to an oxidising plasma such that the Si—H bonds are oxidised to Si—OH groups. These two steps may be repeated at least once more in order to provide a reactive particle surface for grafting with a variety of organosilanes.

The present invention provides the user with the ability to treat solid particles in a dry and cost effective process and in particular the opportunity to functionalise substantially inert or low reactive solid substrates, resulting in the possibility of providing high level and multiple surface functionalities. It also provides the user with the opportunity to functionalise a wide range of particle sizes eg from 20 nm. It is also an excellent route to increase performances of treated particles.

Powdered substrates functionalised and/or coated by the method of the present invention may have various utilities. For example, a silica based coating may provide enhanced barrier (oxygen and/or moisture) properties and controlled release properties to an organic substrate particle such as a fragrance, flavour, pharmaceutical or dyestuff. Improved compatibility may be achieved for metal or metal oxide powders used as reinforcing or property modifying fillers in rubbers and plastics. Improved compatibility may also be utilised for substrates generally used in dispersions such as dyestuffs/pigments, antioxidants and UV stabilisers in polymer materials and also formulated products such as paints and cosmetics. Powder processing may be improved by enhancing characteristics such as flow, compatibility and electrostatic properties. Specific functionalities may be added to catalysts and catalyst supports to enhance or control reactivity. Also surface and pore properties of powders used as separation media or as support for separation media may be controlled by functionalising powdered substrates in accordance with the present invention.

Other powders functionalised by the method of the present invention may include:

i) Functionalised crumb silicone and/or organic rubber (eg, Natural rubber, EPDM styrene-butadiene rubbers (SBR) and NBR), Polypropylene and Thermosets, ie powdered rubber recycled from eg tyres made from particulates of varying sizes ranging from 200 to 1500 μm for reuse in organic or silicone based composites.

ii) Functionalised Nanoparticles for application onto flexible substrates for sensors, eg biosensor applications and for photonics applications eg luminescence and photonic crystals.

iii) Functionalised organofunctional silicone resins for incorporation of said resins in a wide variety of compositions.

Applications include, for example, adding flexibility and abrasion resistance in protective coatings used in the automotive industry.

iv) Functionalised conductive fillers for surface treatment of microprocessors mixed in silicone elastomers to protect filler surfaces from oxidation at high temperature and humidity level to prevent lower electrical conductivity.

v) Functionalised nanodispersions of $TiO_2$ in organopolysiloxane polymers with higher Refractive Indices for optical uses like antireflective coatings for display devices, intra-ocular and optical lenses, optical amplifying fibres, high Refractive index adhesives, photonic crystals or for cosmetic application eg hair care composition with enhanced shine properties.

vi) Functionalised powdered substrates for use in resin or the like, for which adhesion to carbon, graphite, graphite fibres and more broadly glass quartz and stainless steel is very difficult, for use for example in the flexible electronics, solid state lighting, thin film batteries and photovoltaic cell markets, and for separation membranes.

vii) Functionalised pigments for use as fillers eg $TiO_2$, Carbon black, $SiO_2$, $CaCO_3$, $Al_2O_3$. In aqueous and organic media while maintaining the rheology, colour intensity, and hiding powder properties eg a colour stabilization and enhancement treatment, for use in automotive, coating, tyre and wood industries, low cost filler applications.

3-Dimensional deposition of silicones either or both in the washing and rinsing cycles for fabric care application.

Encapsulation/functionalisation of powdered substrates used as actives specifically vitamins, sunscreens and fragrances, to enable for example their delivery by controlled release. Surface activation may improve deposition of active ingredients onto specific substrates and improve targeting delivery of active ingredients to specific sites of action. Use in Physical or chemical stabilization of active ingredients that are unstable to oxygen, heat and/or light. The encapsulants of actives such as biomolecules must be water soluble or compatible to allow formulation and delivery. Examples of suitable biomolecules might include vitamins A, C, D, E, phospholipids, alkylpoly glucosides, betaine, sodium lauryl sulfate, fragrance, drugs, UV blockers, incompatible components like organic oils, dyes, which need protection for several months for stability against oxygen, water, and agglomeration. Such encapsulants are required for, for example, several applications including, encapsulated sunscreens, functionalised sunscreens, encapsulated vitamins A, C, E and controlled hypoallergenic fragrance release.

Functionalisation of substrates such as pigments for preventing agglomeration and improving compatiblisation in formulations. The formulation and compatiblisation of pigments for healthcare, fabric care, skin care, personal care, and hair care (conditioners) is limited due to the surface chemistry and size of the particles. Nano-particles are not used today due to their tendency to aggregate, their high surface reactivity and for compatibility issues. Hence functionalised particles in accordance with the present invention eg pigment particles, such as $SiO_2$, $TiO_2$, $Fe_2O_3$, ZnO, Clays and mica, which have been homogeneously treated in accordance with the process of the present invention may be used to enhance and/or provide hydrophobic, lipophobic, hydrophilic electrical properties, and/or provide surface modification to improve better formulation compatibility. Mineral fillers such as $TiO_2$ carbon black, clays, $CaCO_3$, talc, silica, which may, for example, be used for the reinforcement of plastics, elastomers and silicone and/or organic synthetic rubber products eg tyres as well as pigments for plastics and the like may also be surface activated and/or functionalised by the process of the present invention.

Nanoparticulate material may be treated in accordance with the method of the present invention so as to allow the nanoparticles to be incorporated and dispersed in a media of choice. The small size of the nanoparticles provides various benefits such as transparency or scattering of light, different feel, high chemical reactivity, and long-term stability.

Other applications of functionalised particles in accordance with the present invention include improving the compatibility of silicones with organic actives, oils and polymers; the Functionalisation of filter media with various ligands, chemical groups, and enzymes for selective separation, filtration and/or solid phase extraction applications.

Figure 2:
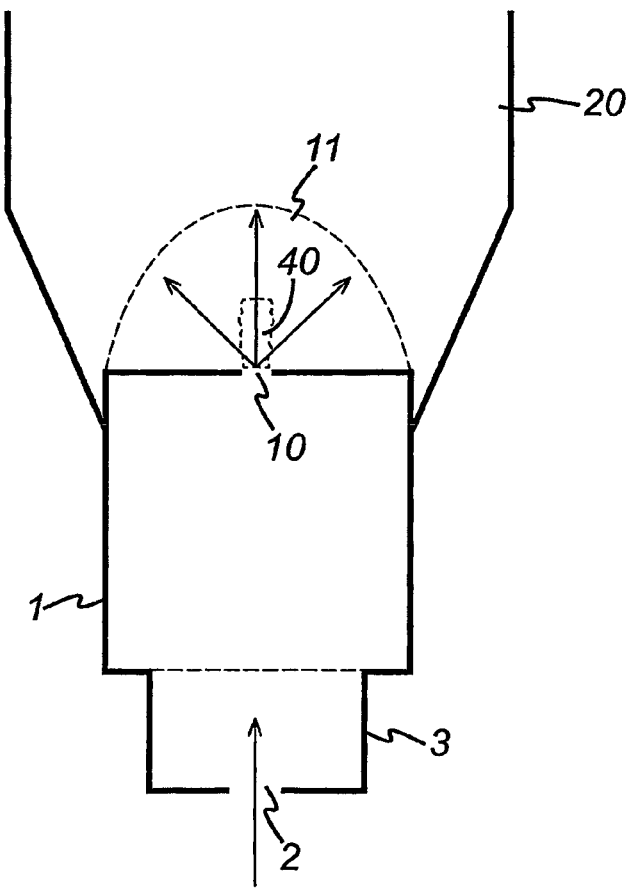

The present invention will now be described further on the basis of the following drawings, examples and comparative examples in which:

FIG. 1 shows a schematic view of a means for generating excited and/or unstable gas species according to the invention;

FIG. 2 schematically shows a fluidised bed adapted to fit the means as shown in FIG. 1

Figure 3:
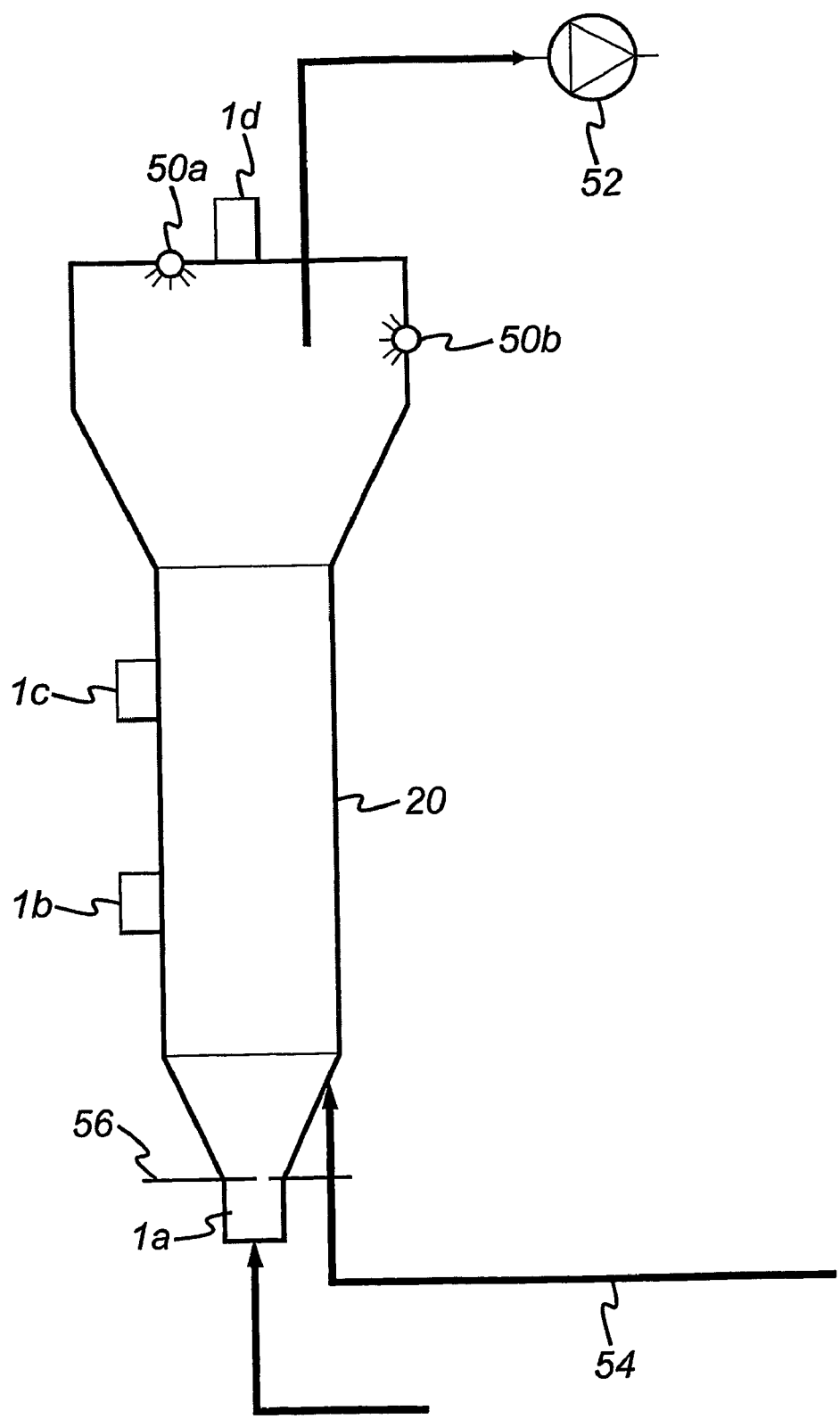

FIG. 3 is a detailed schematic drawing of a fluidised bed in accordance with one embodiment of the present invention.

FIG. 1 shows a means for generating excited and/or unstable gas species 1, having an inlet 2 to a gas homogenisation chamber 3 and an inlet 4 for a gas to pass from homogenisation chamber 3 into electrode configuration 15. Electrode configuration 15 comprises an outer electrode 5, an inner electrode 6, and a layer of dielectric material 7 on the inner electrode 6. Both electrodes 5 and 6 are substantially tubular in construction and are adapted to provide means 1 with a tubular channel 9 there between, adapted to receive and guide all gas entering inlet 4 from chamber 3 to an excited and or unstable gas species outlet slit 10. Channel 9 is substantially tubular and preferably has an axial length of up to 1 meter but is typically less than 50 cm long. The distance between the outer surface of dielectric layer 7 and the inner surface of outer electrode 5) is up to 100 mm, but is preferably less than 10 mm. Slit 10 extends over the full axial length of the system. In use the channel, 9, is the region in which plasma is generated as gas passes though means 1.

Electrodes 5 and 6 are connected to a high voltage and high frequency electrical generator 8, operating at a frequency of greater than 15 kHz and delivering a power of, in the order, of 10 kW.

In use a gas to be rendered excited and/or unstable is introduced into homogenisation chamber 3 through inlet 2, and subsequently, into the electrode configuration 15. A plasma, dielectric barrier discharge and/or corona discharge is generated between electrodes 5 and 6 as the gas passes through channel 9, resulting in high energy species leaving means 1, via exit 10. The charged species formed within channel 9 remain in channel 9, ie between the electrodes. However, the gas comprising uncharged, excited and/or unstable species leaves configuration 15 through outlet 10, and forms a downstream region 11. In which region it interacts with powdered substrate and, optionally, the functionalising materials in accordance with the present invention. As previously discussed, the voltage applied between the electrodes may be switched off prior to the introduction of the functionalising materials. A plume 40 is visible to the naked eye and is believed to be the result of previously excited and/or unstable species giving off energy when returning to their ground state after having existed in said excited state for a period of time in downstream region 11.

FIG. 2 shows an embodiment of the invention where means 1 in accordance with the invention is adapted for use in a fluidised bed 20, such that gas enters entrance 2 and, subsequent to excitation of the type described in relation to FIG. 1 above, leaves the configuration through exit slit 10 and enters fluidised bed 20. The flow rate of the gas passing through the channel 9/electrode configuration 15 is such that said gas also acts as the fluidising gas in fluidised bed 20. The downstream region is again identified by 11 and the plume is seen at 40 along the exit slit 10.

FIG. 3 is a more detailed schematic drawing of a fluidised bed in accordance with an embodiment of the method of the present invention, including a means of forming excited and/or unstable gas species 1a, as described in conjunction with FIGS. 1 and 2. Alternative, and/or additional, sites for means of forming excited and/or unstable gas species are identified by numerals 1b, 1c and 1d. A means for introducing a liquid precursor 50a is provided at the top of the fluidised bed, and an alternative and/or additional means for same is indicated at 50b. Preferably such means, 50a and 50b, introduce liquid precursor in the form of a liquid spray through an atomiser or nebuliser of the type described in the applicants co-pending application WO 02/28548. A slide valve 56 is provided immediately above the means of forming excited and/or unstable gas species 1a, this is intended as a means of preventing powder and precursor from entering electrode configuration 15 (FIG. 1) once the flow of gas through means 1 has been switched off. This valve 56 may be replaced by the mesh as described previously, where appropriate. Waste gases may be removed from the fluidised bed 20 via gas removal/particle recovery system 52 and are seen to be removable using a pneumatic conveying apparatus at the base of the fluidised bed 54.

In use the gas to be excited is passed through means 1 (FIG. 1), as described above with respect to FIGS. 1 and 2, at a rate sufficient to provide gas circulation within the fluidised bed to render the fluidised bed 20 operative. Once the fluidised bed is at a suitable state the voltage across the electrodes 5, 6 is applied resulting in the generation of a plasma or the like. The velocity of the gas travelling through means 1 results in charged particles being retained in channel 9, whereas the non-charged excited and/or unstable particles pass through exit 10, and into fluidised bed 20 to form a downstream region. Once the downstream region 11 has equilibrated, the substrate/solids are introduced into the downstream region 11 via line 54, and the particles are activated in the downstream region by the excited and/or unstable particles produced by the plasma. The functionalising material may then be added whilst the plasma in means 1 is still functioning, however, preferably the voltage across the electrodes 5,6 is switched off prior to the introduction of the functionalising materials, ie substantially all the excited and/or unstable species forming the downstream region have returned to there unexcited states, or been dispersed, so that the functionalising material is not excited. In both options the gas flow is maintained at a substantially constant velocity to ensure the functioning of the fluidised bed 20. The option to be taken really needs to be determined dependent on the substrate and functionalising particles being utilised. In the case when only a single functionalising step occurs, the functionalised particles may then be removed from the fluidised bed 20. The process for removal of the functionalised particles is that the gas flow through means 1 is switched off and substantially simultaneously the slide valve is actuated to prevent particles from passing back into means 1 under gravity. The functionalised particles may then be removed from the fluidised bed 20 by, for example, pneumatically conveying via line 54.

In the event that a multi-step process is being utilised preferably, a predetermined amount of functionalising material is introduced for a set amount of substrate already present in the fluidised bed 20 and the mixture is mixed within the fluidised bed 20 for a predetermined period of time. Where appropriate a sample of the resulting functionalised substrate may be removed from the system for analysis. But preferably, the process is automated such that after a set period of mixing with the first functionalising material an alternative gas source could be used, for example, an oxidising or reducing gas as described above, or a further coating/functionalising material may be introduced into the fluidised bed to interact with the initially functionalised material. The process can be followed for each different chemical change/coating/functionalising step required, which can then be extracted via for example line 54 by pneumatic conveying or any other suitable means.

As indicated in FIG. 3, whilst the above description has merely referred to a single introduction means and plasma source etc., multiple plasma sources and functionalising material introduction means may be utilised, and where appropriate, further gas inlets may be provided to ensure the functionability of the fluidised bed.

EXAMPLE 1

Rice hull ash was fed into an 8 L reaction chamber on which was attached the post plasma discharge source (as described in FIG. 1), hereafter referred to as the post plasma discharge reactor. A 1,3,5,7-tetramethylcyclotetrasiloxane, 1,3,5,7,9-pentamethylcyclo pentasiloxane and 1,3,5,7,9,11-hexamethylcyclohexasiloxane mixture was sprayed via a pneumatic nebulisation nozzle into the post plasma discharge reactor and within the downstream or post discharge atmospheric plasma phase and the mixture was treated within the downstream region for a period of over 35 min. The reactive gas mixture was 250 l/min of nitrogen ($N_2$). The power of the post discharge atmospheric plasma was 2,200 W. The resulting treated rice hull ash was recovered and further analysed. The composition of the resulting treated rice hull ash was determined by $^{29}Si$ MAS NMR spectroscopy. The powder was functionalised with an organosilicon material of $D^HTQ$ composition. NMR results indicated that covalent bond formation had occurred due to reaction between the surface of the rice hull ash substrate and the organosilicone material (ie the 1,3,5,7-tetramethylcyclotetrasiloxane, 1,3,5,7,9-pentamethylcyclo pentasiloxane and 1,3,5,7,9,11-hexamethylcyclohexasiloxane mixture). It was found that the treated rice hull ash was floating on water because of the hydrophobic nature of the functionalised surface whereas the untreated rice hull ash substrate sank, indicating a hydrophilic surface.

EXAMPLE 2

Specific Details of the Reactor Used in Subsequent Examples

A fluidised bed reactor was constructed with a 200 mm square section in 4 mm thick polycarbonate. The reactor consists of a straight section of height approx 1 m together with an expanded head of square section 300 mm, also of height approx 1 m. The base tapers to a rectangular slit of cross section approx 150 mm×30 mm. To avoid material build-up on surfaces, vertical angles are limited to no less than 20 degrees from vertical (ie max cone angle 40 degrees at the base). The polycarbonate was readily fused together by means of a hot air gun.

The rectangular slit was then fitted with a 4 mm polycarbonate flange adapted to be suitable with respect to the dimensions of plasma generating device utilised. The atmospheric pressure glow discharge plasma generating device was then attached to the base of the reactor together with a gasket for sealing. A slide valve was also incorporated into the assembly to enable closure of the base of the reactor above the plasma device and to enable shutdown without contamination of the plasma device.

Liquids are sprayed into the unit with one or more nebulising devices capable of generating liquid droplets at about 1-10 micron size (eg Cirrus™ Nebulizer code 1501 sold by Intersurgical). Depending on the liquid in question the carrier gas can be air or an inert gas (eg nitrogen). Typical entry point for the nebulized liquid stream is at the start of the square section or approx 200 mm away from the plasma head. In use, the droplets enter the region inhabited by excited species generated by the plasma generating assembly and the powdered substrate and the powdered substrate is functionalised due to their interactions.

Solids recovery was achieved with an external cyclone designed for inlet velocities of approximately 50 ft per second or contained within the fluidised bed reactor by a filter fitted at the top of the reactor. Solids were returned by suction with a venturi nozzle operating at about 20 liters per minute compressed air (or inert gas) enabling solids return to the reactor from the base of the cyclone. The venturi nozzle used had an orifice diameter of 0.9 mm and an air/gas supply pressure of 6 bar gauge.

EXAMPLE 3

Use of an Oxidising Gas to Increase the Level of Reactive Groups on a Rice Hull Ash Substrate 200 g to 2 kg of rice hull ash (RHA) was fed into the fluidised bed reactor described in Example 2. The RHA substrate was fluidised in contact with the excited species generated by the plasma assembly (hereafter referred to as "atmospheric plasma post-discharge" for a period of 30 minutes in the presence of an oxidising gas, resulting in an oxidative plasma post-treatment of the substrate. The source of the atmospheric plasma post-discharge (reactive gas mixture) was 250 l/min of air. The power delivered to the plasma assembly was 1,800 W. RHA treated in accordance with the present invention was sampled over time for NMR characterization and wettability analysis. The wettability test comprising the step of deposition of a water droplet revealed that the oxidative plasma post-discharge treated RHA was more hydrophilic than for the raw powder. $^{29}$Si NMR confirmed the formation of reactive hydroxysilyl functionality. The $O_{1.5}SiOH/SiO_2$ ratio was increased by up to 35% over time by plasma post-discharge treatment. This meant that the surface of the RHA had been successfully treated by the oxidising gas resulting in "surface activation".

EXAMPLE 4

Functionalisation of an RHA Substrate 200 g of RHA substrate was fed into the fluidised bed reactor described in Example 2. The RHA substrate was fluidised in the presence of the downstream region of atmospheric plasma post-discharge resulting from plasma generation for a period of 30 min. The reactive gas mixture used in the generation of the plasma, downstream region and for fluidising the bed was air at 250 L/min. The power delivered to the plasma source for the generation of the downstream region of atmospheric plasma post discharge was 1,800 W.

After the substrate had been surface activated by exposure to the downstream region of plasma post-discharge, the plasma source was switched off whilst retaining the reactive gas flow rate in order to maintain the fluidised bed and 20 g of n-octyltriethoxysilane was sprayed into the fluidised bed using two pneumatic nebulisation nozzles and was left to react with the activated RHA substrate for a period of over 35 min. The resulting treated RHA substrate was sampled for NMR and wettability analysis. The wettability test was undertaken by deposition of a water droplet and revealed that the RHA substrate treated by the process in accordance with the present invention was partially hydrophobic. $^{29}$Si NMR and $^{13}$C NMR confirmed the functionalisation of the rice hull ash substrate with n-octylsilyl groups.

A plasma was then generated again resulting in the formation of the downstream region of oxidative plasma post discharge which was applied to the n-octylsilyl-treated RHA for a period of 3 min. under the same process conditions as described earlier (250 L/min. of air, 1,800 W). The final resulting powder was recovered and analysed by NMR and video contact angle (VCA). A sessile drop of water (1 µL) deposited on a packed bed of RHA displayed a contact angle of 146°, showing very high hydrophobicity property of the powder. NMR confirmed the retention of n-octyl functionality and a higher condensation degree compared to original post-plasma treatment.

EXAMPLE 5

Part Functionalisation of an RHA Substrate by Non-Exposure to the Downstream Region of Plasma Post-Discharge and Subsequent Functionalisation Subsequent to Exposure to the Downstream Region of Plasma Post-Discharge 200 g of RHA substrate was fed into the fluidised bed reactor described in Example 2. The RHA substrate was fluidised using 250 L/min. of $N_2$ gas without plasma generation for a period of 15 min. 20 g of a 1,3,5,7-tetramethylcyclotetrasiloxane, 1,3,5,7,9-pentamethylcyclo pentasiloxane and 1,3,5,7,9,11-hexamethylcyclohexasiloxane mixture were sprayed into the reactor via a pneumatic nebulisation nozzle and thus over 35 min. The treated substrate was sampled for further NMR and solvents wettability analysis. Wettability test by deposition of a water droplet revealed that the treated RHA was hydrophobic. $^{29}$Si NMR confirmed the partial functionalisation of the RHA substrate with SiH ($D^H$ sub-units) and SiMe ($D^H$ and $T^{Me}$ sub-units) groups. Dispersing the powder and washing with toluene revealed that up to 50 mol % of the $D^H$ species were not covalently bonded to the RHA substrate.

The partially treated RHA substrate was subjected to an oxidative plasma post-treatment applied to the methylhydrogensilyl-treated RHA by generation of a downstream region for periods of 10 and 40 min. under the same process conditions as described earlier (250 L/min. of air, 1,800 W). The resulting oxidatively treated RHA substrate powders were sampled over time and analysed by both NMR and the aforementioned wettability test. It was found that the initially hydrophobic RHA substrate powder progressively became fully wettable with water as the substrate surfaces were oxidised/activated in the downstream region. NMR confirmed the degradation of the $D^H$ sub-units and conversion under oxidative conditions to $O_{1.0}SiMeOH$ and $O_{1.5}SiOH$ resulting in the RHA substrate surface having a significantly higher degree of reactivity due to the oxidative activation undergone by interaction with plasma post-discharge in the downstream region. Thermogravimetric analysis (TGA) undertaken in an air atmosphere showed a constant degree of weight loss upon heating from 120 to 600° C., indicating that the main polysiloxane structure remains on the surface of the RHA in support of the NMR analysis with only the substitution of hydrogen and/or methyl groups with hydroxyl groups.

EXAMPLE 6

Multi-Step Functionalisation Process of an RHA Substrate 200 g of RHA substrate was fed into the fluidised bed reactor described in Example 2. The RHA substrate was fluidised in the presence of the downstream region of atmospheric plasma post-discharge resulting from plasma generation for a period of 30 min. The reactive gas mixture used in the generation of the plasma, downstream region and for fluidising the bed was air at 250 L/min. The power delivered to the plasma source for the generation of the downstream region of atmospheric plasma post discharge was 1,800 W.

After the RHA substrate had been surface activated by exposure to the downstream region of plasma post-discharge, the plasma source was switched off whilst retaining the reactive gas flow rate in order to maintain the fluidised bed and 20 g of a mixture of 1,3,5,7-tetramethylcyclotetrasiloxane, 1,3,5,7,9-pentamethylcyclo pentasiloxane and 1,3,5,7,9,11-hexamethylcyclohexasiloxane was sprayed into the fluidised bed reactor using a pneumatic nebulisation nozzle and was allowed to interact with the RHA substrate for a period of 35 min. The resulting treated RHA substrate was sampled for analyses. Wettability by deposition of a water droplet revealed that the treated RHA was hydrophobic. The sample was rinsed with $CH_2Cl_2$/toluene and further dispersed and washed with toluene before analysis by NMR and VCA. The hydrophobic powder after washing had a contact angle with a 1 µL water droplet of 125°. $^{29}$Si NMR confirmed the covalent functionalisation of RHA with SiH ($D^H$ sub-units) to a much larger extend than for RHA not activated with plasma (as described in Example 5), and SiMe ($D^H$ and $T^{Me}$ sub-units) groups. TGA confirmed the attachment of the polysiloxane molecules on the surface of RHA.

The partially treated RHA substrate was subjected to an oxidative plasma post-treatment applied to the methylhydrogensilyl-treated RHA by generation of a downstream region for periods of 10 and 40 min. under the same process conditions as described earlier (250 L/min. of air, 1,800 W). Powders were sampled and analysed by NMR and wettability test. The oxidatively treated RHA substrate powder after oxidative post-plasma treatment was found to be slightly hydrophilic. NMR confirmed the degradation of most of the $D^H$ sub-units and conversion under oxidative conditions to reactive $O_{1.0}$SiMeOH and to a larger extent $O_{1.5}$SiOH functional species.

After the RHA substrate had been oxidised by exposure to the downstream region of plasma post-discharge, the plasma source was switched off whilst retaining the reactive gas flow rate in order to maintain the fluidised bed and 20 g of 3-aminopropoyltriethoxysilane was sprayed by means of pneumatic nebulisation nozzles into the fluidised bed reactor and allowed to interact with the RHA substrate for a period of over 35 min. The partially hydrophilic powder was rinsed with $CH_2Cl_2$/toluene and further dispersed and washed with toluene before further analysis. $^{29}$Si NMR, TGA, DRIFT FTIR and XPS confirmed the functionalisation of the rice hull ash substrate with methylsilyl- and 3-aminopropylsilyl- groups.

EXAMPLE 7

Functionalisation of a Titanium Dioxide ($TiO_2$) Substrate Showing Ability to Change Surface Functionality by Varying Functionalising Precursor 200 g of $TiO_2$ powder (anatase) was fed into the fluidised bed reactor described in Example 2. The substrate was fluidised and was allowed to interact with the atmospheric plasma post-discharge in the downstream region for a period of 30 min. The reactive gas mixture used was 250 L/min of air. The power delivered to the plasma source of the atmospheric plasma post discharge was 1,800 W. The resulting plasma post-discharge treated $TiO_2$ was sampled for wettability analysis. The wettability test by deposition of a water droplet revealed that the treated titanium dioxide ($TiO_2$ powder (anatase)) was even more hydrophilic than the untreated raw substrate powder.

After the substrate had been oxidised by exposure to the downstream region of plasma post-discharge, the plasma source was switched off whilst retaining the reactive gas flow rate in order to maintain the fluidised bed and 20 g of a 1,3,5,7-tetramethylcyclotetrasiloxane, 1,3,5,7,9-pentamethylcyclo pentasiloxane and 1,3,5,7,9,11-hexamethylcyclohexasiloxane mixture was sprayed into the reactor by means of two pneumatic nebulisation nozzles and allowed to interact with the RHA substrate for a period of over 20 min. The treated substrate was sampled for further analysis. Wettability testing by deposition of a water droplet revealed that the treated titanium dioxide ($TiO_2$ powder (anatase)) was hydrophobic. $^{29}$Si NMR, DRIFT FTIR and TGA confirmed the formation of $O_{1.0}$SiMeH, $O_{1.0}$SiMeOH and $O_{1.5}$SiMe sub-units with retention of the surface composition upon subsequent rinsing and washing steps in $CH_2Cl_2$ and toluene.

Oxidative plasma post-treatment was applied to the methylhydrogensilyl-treated titanium dioxide ($TiO_2$ powder (anatase)) for 5 min. under the same process conditions as described earlier (250 L/min. of air, 1,800 W). Subsequent to treatment the substrate powders were sampled and analysed. Wettability testing by deposition of a water droplet revealed that the treated titanium dioxide was hydrophilic again. $^{29}$Si NMR, DRIFT FTIR and TGA confirmed the retention of the $O_{1.5}$SiMe sub-units and the partial conversion of $O_{1.0}$SiMeH sub-units into $O_{1.0}$SiMeOH and $O_{1.5}$SiMe sub-units.

Again, after the substrate had been oxidatively treated by exposure to the downstream region of plasma post-discharge, the plasma source was switched off whilst retaining the reactive gas flow rate in order to maintain the fluidised bed and 20 g of n-octyltriethoxysilane were sprayed by means of two pneumatic nebulisation nozzles into the reactor over 30 min. The initially hydrophilic powder became superhydrophobic upon treatment with a contact angle of a 1 µL water droplet of 150°. TGA, $^{29}$Si NMR, $^{13}$C NMR and DRIFT FTIR confirmed the functionalisation of titanium dioxide with SiH ($D^H$ sub-unit), SiMe ($D^H$ and $T^{Me}$ sub-units) and Si-Octyl ($T^{Octyl}$ sub-unit) groups. TGA under air atmosphere confirmed the loss of residual volatiles eg ethanol below 120° C. and of the alkyl groups. A weight loss of 1.5 wt % corresponding to the alkyl chain was observed, confirmed by carbon analysis after drying the powder at 120° C.

EXAMPLE 8

Comparison Of Non-Functionalisation of Substrate Particles in the Absence of Plasma Post Discharge with Functionalisation by Subsequent Introduction of Plasma Post Discharge 200 g of $TiO_2$ powder (anatase) was fed into the fluidised bed reactor described in Example 2. The substrate was fluidised in contact with 250 L/min. of air without plasma for 16 min. 20 g of a 1,3,5,7-tetramethylcyclotetrasiloxane, 1,3,5,7,9-pentamethylcyclo pentasiloxane and 1,3,5,7,9,11-hexamethylcyclohexasiloxane mixture were sprayed into the reactor by means of two pneumatic nebulisation nozzles and was allowed to interact with the substrate for over 20 min. The resulting treated substrate was sampled for wettability analysis. The wettability test by deposition of a water droplet revealed that the treated titanium dioxide $TiO_2$ powder (anatase) was still hydrophilic just like the raw starting material, revealing that functionalisation did not occur or was minimal.

Oxidative plasma post-discharge treatment was applied to the substrate powder for 12 min. under the same process conditions described earlier (250 L/min. of air, 1,800 W). After the substrate had been oxidised by exposure to the downstream region of plasma post-discharge, the plasma source was switched off whilst retaining the reactive gas flow rate in order to maintain the fluidised bed and 14 g of a 1,3,5,7-tetramethylcyclotetrasiloxane, 1,3,5,7,9-pentamethylcyclo pentasiloxane and 1,3,5,7,9,11-hexamethylcyclohexasiloxane mixture was sprayed into the reactor by means of two pneumatic nebulisation nozzles and thus over 11 min. The resulting treated substrate was sampled for wettability analysis. Wettability test by deposition of a water droplet revealed that the treated titanium dioxide ($TiO_2$ powder (anatase)) was now hydrophobic, revealing that plasma-assisted functionalisation did effectively occur.

EXAMPLE 9

Comparative Example Showing an Unsuccessful Attempt to Functionalise a Titanium Dioxide Substrate by Wet Process Techniques 6.6 g of $TiO_2$ powder (anatase) was dispersed into 6.6 g of a 1,3,5,7-tetramethylcyclotetrasiloxane, 1,3,5,7,9-pentamethylcyclo pentasiloxane and 1,3,5,7,9,11-hexamethylcyclohexasiloxane mixture in 40 ml of toluene in a glass reaction vessel. The mixture was stirred for 5 hours at room temperature. The solid was filtrated and rinsed with $CH_2Cl_2$ and toluene. The solid was re-dispersed into 50 ml of toluene and stirred overnight. The powder was filtrated, rinsed and dried prior to NMR, DRIFT FTIR and wettability analysis. Wettability test by deposition of a water droplet revealed that the treated titanium dioxide was still hydrophilic as for the raw titanium dioxide ($TiO_2$ powder (anatase)) starting material. No silicon containing functionalities were observed by $^{29}Si$ NMR.

EXAMPLE 10

Functionalisation of a Titanium Dioxide Substrate and Post-Plasma Treatment 200 g of $TiO_2$ powder (anatase) was fed into the fluidised bed reactor described in Example 2. The $TiO_2$ powder (anatase) substrate was fluidised in the presence of the downstream region of the atmospheric plasma post-discharge for a period of 10 min. The reactive gas mixture was 250 l/min of air. The power delivered to the plasma source of the atmospheric plasma post discharge was 1,800 W.

After the substrate had been oxidised by exposure to the downstream region of plasma post-discharge, the plasma source was switched off whilst retaining the reactive gas flow rate in order to maintain the fluidised bed and 20 g of n-octyltriethoxysilane was sprayed into the reactor by means of two pneumatic nebulisation nozzles and thus over 25 min. The treated substrate was sampled for further analysis. The initially hydrophilic powder became super hydrophobic upon treatment with a contact angle of a 1 μL water droplet of 150°. $^{29}Si$ NMR, $^{13}C$ NMR, and TGA confirmed the functionalisation of titanium dioxide ($TiO_2$ powder (anatase)) with Si-Octyl ($T^{Octyl}$ sub-unit) groups. TGA under air atmosphere showed a weight loss attributed to the oxidation of hydrocarbons.

Oxidative plasma post-discharge treatment was applied to the octylsilyl-functional titanium dioxide powder for 1 min. under the same process conditions than described earlier (250 L/min. of air, 1,800 W). The final powder was recovered and analysed by NMR and VCA. The powder was still superhydrophobic upon post-treatment with a contact angle of a 1 μL water droplet of 152°. NMR confirmed the retention of the n-octyl functionality and a higher condensation degree compared to before post-plasma treatment.

EXAMPLE 11

Multiple Step Functionalisation Process for High Level Titanium Dioxide Surface Functionality This example was undertaken several times using differing amounts of from 500 g to 2,500 g of $TiO_2$ powder. Each substrate sample was fed into the fluidised bed reactor described in Example 2. The substrate was fluidised in the presence of the downstream region of the atmospheric plasma post-discharge for a period of 30 to 45 min. and was additionally mechanically agitated. The reactive gas mixture used in plasma generation, the formation of the excited and/or unstable species in the downstream region and in the maintenance of the fluidised bed and was 250 L/min of air. The power delivered to the plasma source of the atmospheric plasma post discharge was 1,850 W.

After the substrate had been oxidised by exposure to the downstream region of plasma post-discharge, the plasma source was switched off whilst retaining the reactive gas flow rate in order to maintain the fluidised bed and 10 to 15% by weight (compared to the weight of $TiO_2$) of a 1,3,5,7-tetramethylcyclo tetrasiloxane, 1,3,5,7,9-pentamethylcyclo pentasiloxane and 1,3,5,7,9,11-hexamethyl cyclohexasiloxane mixture were sprayed into the reactor by means of multiple pneumatic nebulisation nozzles and thus over 30 to 120 min.

Plasma was regenerated and the downstream region formed such that oxidative plasma post-discharge treatment was applied to the methylhydrogensilyl-treated titanium dioxide for 10 to 15 min. under the same process conditions as described earlier and under constant mechanical agitation (250 L/min. of air, 1,850 W).

Again after the substrate had been oxidised by exposure to the downstream region of plasma post-discharge, the plasma source was switched off whilst retaining the reactive gas flow rate in order to maintain the fluidised bed and 10 to 15 wt % compared to $TiO_2$ of n-octyltriethoxysilane were sprayed by means of multiple pneumatic nebulisation nozzles into the fluidised bed reactor over a period of 30 to 180 min dependent on the amount of substrate present in the fluidised bed reactor. The resulting treated substrate was recovered in very high yield and further analysed. It was identified that the constant mechanical agitation, had had the effect of providing a very fine hydrophobic powdered substrate as observed by contact angle of a water droplet. $^{29}Si$ NMR, $^{13}C$ NMR and DRIFT FTIR confirmed the functionalisation of titanium dioxide with SiMe, Si-Octyl and residual SiH groups. TGA in an air atmosphere confirmed the loss of residual volatiles below 120° C. eg ethanol of up to 15 wt % and of the alkyl groups of up to 2.3 wt %, as also observed by elemental analysis after further drying at 120° C. These results confirmed the functionalisation of minerals to a much higher level than current other processes.

EXAMPLE 12

Multiple Step Functionalisation Process for High Level Surface Functionality of a Titanium Dioxide Substrate 1,500 g of untreated TiO2 powder was fed into the fluidised bed reactor described in Example 2. The TiO$_2$ powder substrate was fluidised in the presence of the downstream region of the atmospheric plasma post-discharge for a period of 45 min. and under mechanical agitation. The reactive gas mixture was 250 L/min of air. The power delivered to the plasma source of the atmospheric plasma post discharge was 1,850 W.

After the substrate had been oxidised by exposure to the downstream region of plasma post-discharge, the plasma source was switched off whilst retaining the reactive gas flow rate in order to maintain the fluidised bed and 160 mL of a 1,3,5,7-tetramethylcyclotetrasiloxane, 1,3,5,7,9-pentamethylcyclopenta siloxane and 1,3,5,7,9,11-hexamethylcyclohexasiloxane mixture were sprayed into the reactor by means of multiple pneumatic nebulisation nozzles and thus over 60 min.

Plasma was regenerated and the downstream region formed such that oxidative plasma post-discharge treatment was applied to the methylhydrogensilyl-treated titanium dioxide for 15 min. under the same process conditions as described earlier and under constant mechanical agitation (250 L/min. of air, 1,850 W).

Again after the substrate had been oxidised by exposure to the downstream region of plasma post-discharge, the plasma source was switched off whilst retaining the reactive gas flow rate in order to maintain the fluidised bed and the addition of 160 mL of a 1,3,5,7-tetramethylcyclotetrasiloxane, 1,3,5,7,9-pentamethylcyclopentasiloxane and 1,3,5,7,9,11-hexamethylcyclohexasiloxane mixture was repeated by spraying into the reactor over 60 min.

Again, plasma was regenerated and the downstream region formed such that oxidative plasma post-discharge treatment was applied for a second time to the methylhydrogensilyl-treated titanium dioxide substrate for 10 min. under constant mechanical agitation (250 L/min. of air, 1,850 W).

After the substrate had been oxidised by exposure to the downstream region of plasma post-discharge, the plasma source was switched off whilst retaining the reactive gas flow rate in order to maintain the fluidised bed and another 160 mL of polyhydromethyl siloxane was sprayed into the reactor over a period of 160 min. The resulting solid was recovered in very high yield and further analysed. Due to the constant mechanical agitation, the solid was a very fine hydrophobic powder as observed by contact angle of a water droplet. DRIFT FTIR revealed the functionalisation of titanium dioxide with SiMe and SiH groups. TGA under air atmosphere confirmed the low loss of residual volatiles <0.3 wt % below 120° C. and of the methyl groups of up to 3.5 wt %. These results confirmed the functionalisation of minerals to a much higher level than prior art methods.

EXAMPLE 13

200 g of untreated TiO$_2$ powder was fed into the fluidised bed reactor described in Example 2. The substrate TiO$_2$ powder substrate was fluidised in the presence of the downstream region of the atmospheric plasma post-discharge for a period of 10 min. The reactive gas mixture was 250 L/min of air. The power delivered to the plasma source of the atmospheric plasma post discharge was 1,800 W.

After the substrate had been oxidised by exposure to the downstream region of plasma post-discharge, the plasma source was switched off whilst retaining the reactive gas flow rate in order to maintain the fluidised bed and 20 mL of polyhydromethylsiloxane was directly sprayed into the reactor by means of multiple pneumatic nebulisation nozzles and thus over 15 min.

A wettability test by deposition of a water droplet revealed that the treated titanium dioxide was still as hydrophilic as the untreated titanium dioxide starting material. Very little or no treatment was observed compared to example 12, confirming the need for a multi-step treatment for the functionalisation of minerals via this route.

EXAMPLE 14

Multiple Step Functionalisation Process Using Amine Catalyst 2,000 g of untreated TiO2 powder were fed into the fluidised bed reactor described in Example 2. The substrate TiO$_2$ powder substrate was fluidised in the presence of the downstream region of the atmospheric plasma post-discharge for a period of 45 min. and under mechanical agitation. The reactive gas mixture was 250 L/min of air. The power delivered to the plasma source of the atmospheric plasma post discharge was 1,850 W.

After the substrate had been oxidised by exposure to the downstream region of plasma post-discharge, the plasma source was switched off whilst retaining the reactive gas flow rate in order to maintain the fluidised bed and 160 mL of a 1,3,5,7-tetramethylcyclotetrasiloxane, 1,3,5,7,9-pentamethylcyclopenta siloxane and 1,3,5,7,9,11-hexamethylcyclohexasiloxane mixture were sprayed into the reactor by means of multiple pneumatic nebulisation nozzles and thus over 50 min.

Plasma was regenerated and the downstream region formed such that oxidative plasma post-discharge treatment was applied to the methylhydrogensilyl-treated titanium dioxide substrate for 15 min. under the same process conditions than described earlier and under constant mechanical agitation (250 L/min. of air, 1,850 W).

Again after the substrate had been oxidised by exposure to the downstream region of plasma post-discharge, the plasma source was switched off whilst retaining the reactive gas flow rate in order to maintain the fluidised bed and another 160 mL of a 1,3,5,7-tetramethylcyclotetrasiloxane, 1,3,5,7,9-pentamethylcyclopentasiloxane and 1,3,5,7,9,11-hexamethylcyclohexasiloxane mixture were sprayed into the reactor over 50 min.

Plasma was regenerated and the downstream region formed such that oxidative plasma post-discharge treatment was applied again to the methylhydrogensilyl-treated titanium dioxide for 20 min. under constant mechanical agitation (250 L/min. of air, 1,850 W).

Again after the substrate had been oxidised by exposure to the downstream region of plasma post-discharge, the plasma source was switched off whilst retaining the reactive gas flow rate in order to maintain the fluidised bed and 20 g of dipropylamine was then sprayed prior to nebulising 160 mL of n-octyltriethoxy silane into the reactor over a period of 160 min. The resulting solid was recovered in very high yield and further analysed. Due to the constant mechanical agitation, the solid was a very fine hydrophobic powder as observed by contact angle of a water droplet. DRIFT FTIR confirmed the functionalisation of titanium dioxide with SiMe, SiOctyl and residual SiH groups. TGA under air atmosphere confirmed the very low loss of residual volatiles below 120° C., less than 2 wt % compared to up to 15% without the use of dipropylamine condensation catalyst (example 11) as well as a higher alkyl groups loss of above 3 wt %. These results confirmed the functionalisation of minerals to a much higher level than current other processes with low level of residual volatiles and higher level of functionalities than described in previous examples, by use of mild basic catalyst.

The invention claimed is:

1. A method of functionalizing a powdered substrate, which method comprises the following steps:
   i) passing a gas into a means for forming excited and/or unstable gas species;
   ii) treating said gas such that upon leaving said means the gas comprises excited and/or unstable gas species which are substantially free of electric charge at a temperature below 500° C.;
   iii) treating the powdered substrate with said excited and/or unstable gas species and a functionalizing precursor in a downstream region external to the means for forming excited and/or unstable gas, wherein neither the powdered substrate nor the functionalizing precursor have been subjected to steps (i) and (ii) and wherein said functionalizing precursor is introduced simultaneously with or subsequent to introduction of the powdered substrate;
   iv) collecting resulting functionalized substrate wherein the liquid and/or gas functionalizing precursor is an organopolysiloxane having viscosity from 0.65 to 1000 mPa.s.

2. A method in accordance with claim 1 wherein the means to generate excited and/or unstable gas species is an electrical discharge apparatus.

3. A method in accordance with claim 1 wherein the powdered substrate and/or functionalizing precursor is/are treated by the excited and/or unstable gas species in a container.

4. A method in accordance with claim 3 wherein the container is a fluidised bed and/or circulating bed reactor.

5. A method in accordance with claim 4 wherein the gas comprising excited and/or unstable gas species is utilised as the gas in the fluidised or circulating bed for suspending powders, and/or droplets of liquid.

6. A method in accordance with claim 1 wherein the liquid and/or gas functionalizing precursor is in the form of a liquid compound, a solution of a high viscosity liquid or solid compound in either a liquid carrier or a liquid co-reactive and/or a molten solid.

7. A method in accordance with claim 6 wherein the liquid functionalizing precursor comes into contact with the powder substrate either in the presence of or not in the presence of the excited and/or unstable gas species.

8. A method in accordance with claim 1 wherein the functionalizing precursor is introduced in the form of an atomised liquid.

9. A method in accordance with claim 3 wherein the atomised liquid is introduced into the container at any position by direct injection.

10. A method in accordance with claim 1 wherein the liquid and/or gas functionalizing precusor is an organometallic compound of titanium, zirconium, iron, aluminium, indium and tin or mixtures containing one or more thereof.

11. A method in accordance with claim 1 wherein the liquid and/or gas functionalizing precursor is an organometalloid compound of germanium or silicon.

12. A method in accordance with claim 11 wherein the organometalloid compound is selected from an organosilane and an inorganic silane where the inorganic groups are selected from halogeno, hydrogeno, or hydroxyl groups, and mixtures thereof.

13. A method in accordance with claim 12 wherein the organosilane is a functionalised silane containing one or more organic groups selected from the following alkenyl, aryl, H, OH, amino groups, aldehyde groups, alkyl halide groups, alkyne groups, amido groups, carbamate groups, urethane groups, organic salts, carboxylic acid groups and their derivatives, organic groups containing boron atoms, phosphorus atoms, or sulphur containing groups, or grafted or covalently bonded amino acids and/or their derivatives, grafted or covalently bonded proteins, enzymes and DNA.

14. A method in accordance with claim 1 wherein the functionalizing precursor is an organic compound.

15. A method in accordance with claim 1 wherein the powdered substrate is selected from one or more of a compound selected from the group of a metallic oxide, a metalloid oxide, a mixed oxide, an organometallic oxide, an organometalloid oxide, an organo mixed oxide resin, and/or an organic resin.

16. A method in accordance with claim 1 wherein the powdered substrate is selected from one or more of the following:
   metals, metal oxides, silica and silicates, carbon, carbon nanotubes, carbon and silicon nanostructures, organic powdered substrates, pharmaceutical powdered substrates, biologically active compounds, grafted or covalently bonded amino acids and/or their derivatives, grafted or covalently bonded proteins, enzymes and DNA, silicone resins, mineral fillers, metal oxides and mixed oxides, graphite, phosphorus particles, organic and inorganic pigments, metalloid oxides, organometallic oxides, organometalloid oxides, organomixed oxide resins and/or an organic resin, sodium carbonate, potassium nitrate, silicon metal particles, silicone rubber crumb, organic rubber crumb, wood dust and/or plastics.

17. A method in accordance with claim 1 wherein the product of step (iii) is retreated with an excited and/or unstable gas species and/or a functionalizing precursor.

18. A method of functionalizing a powdered substrate, which method comprises the following steps: i) passing a gas into a means for forming excited and/or unstable gas species; ii) treating said gas such that upon leaving said means the gas comprises excited and/or unstable gas species which are substantially free of electric charge; at a temperature below 500° C.; iii) treating the powdered substrate with said excited and/or unstable gas species and a functionalizing precursor in a downstream region external to the means for forming excited and/or unstable gas, wherein neither the powdered substrate nor the functionalizing precursor have been subjected to steps (i) or (ii) and wherein said functionalizing precursor is introduced simultaneously with or subsequent to introduction of the powdered substrate, wherein a catalyst selected from a mild basic organic compound and a mild basic inorganic compound is utilized to catalyze the process of step (iii) involving a condensation reaction; and (iv) collecting resulting functionalized substrate.

19. A method in accordance with claim 17 wherein a substrate is subjected to an Oxidative plasma post-discharge treatment to promote oxidation and condensation reaction.

* * * * *